F. G. GAUNTT.
FEEDING DEVICE.
APPLICATION FILED MAR. 22, 1917.
1,258,668.
Patented Mar. 12, 1918.
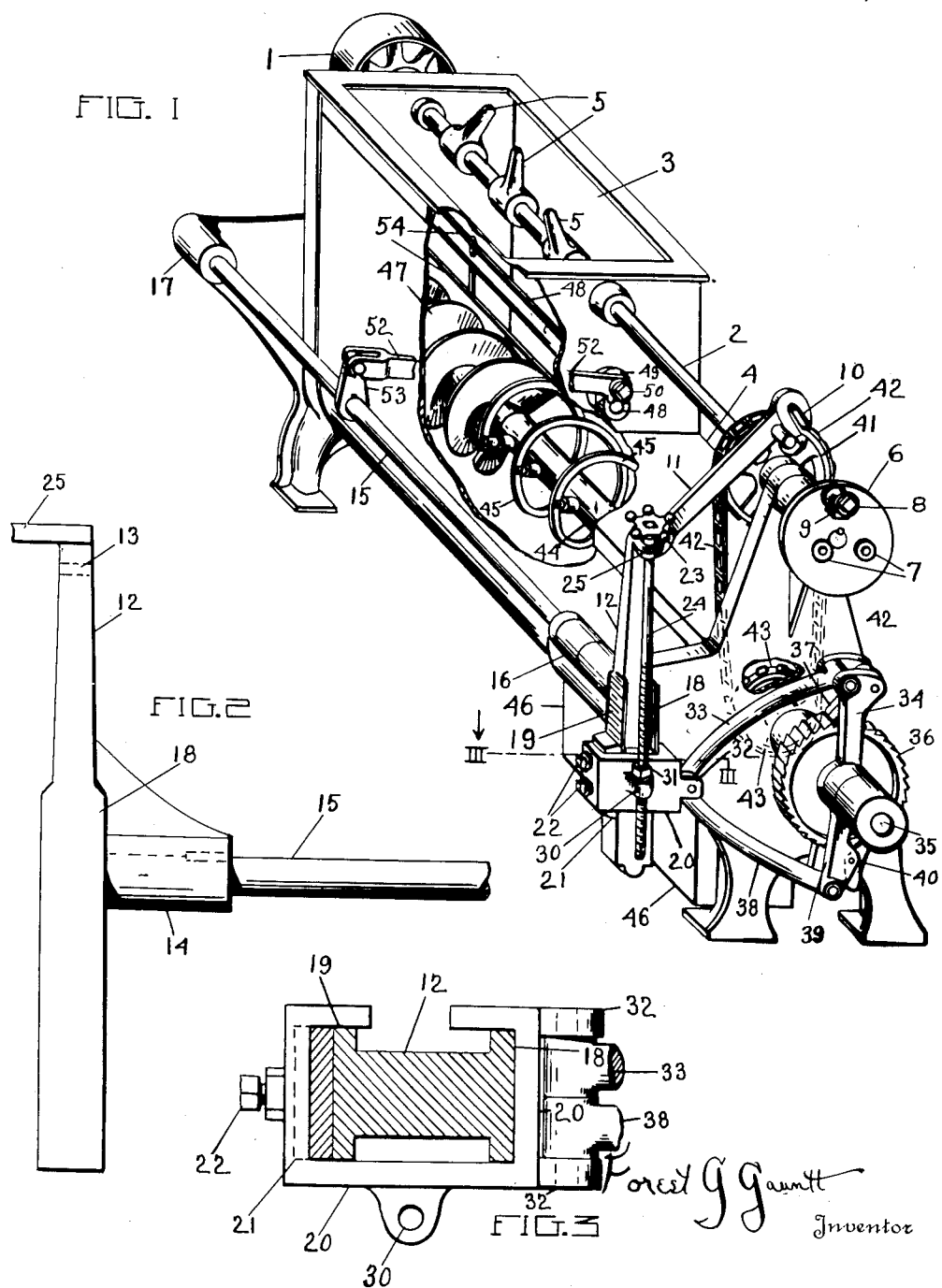

UNITED STATES PATENT OFFICE.

FOREST G. GAUNTT, OF FORT WAYNE, INDIANA, ASSIGNOR TO W. J. SAVAGE COMPANY, OF KNOXVILLE, TENNESSEE, A CORPORATION OF TENNESSEE.

FEEDING DEVICE.

1,258,668.　　　　Specification of Letters Patent.　　Patented Mar. 12, 1918.

Application filed March 22, 1917. Serial No. 156,798.

*To all whom it may concern:*

Be it known that I, FOREST G. GAUNTT, a citizen of the United States of America, residing at Fort Wayne, Allen county, Indiana, have invented new and useful Feeding Devices, of which the following is a specification.

This invention relates to the agitation and handling of material.

This invention has utility in feeding particles of matter of various degrees of fineness.

Referring to the drawings:

Figure 1 is a perspective view, with parts broken away, of an embodiment of the invention in a feeder, especially adapted for the handling of chemicals and various dry granular materials, especially cereals, say in mixing of feed for stock or poultry;

Fig. 2 is a detail view in side elevation of the transmission lever, parts being broken away; and Fig. 3 is a section on the line III—III, Fig. 1.

Power may be applied to the drive pulley 1 upon the shaft 2, extending through the hopper 3 mounted upon the housing 4. This hopper or supply way 3 may have agitators 5 therein carried by the driving shaft 2. This driving shaft 2 is provided with a disk 6 rigid therewith and having a plurality of openings 7 at different radial distances for various adjustments of a wrist pin or crank 8 which may have its bearing block 9 adjustably engaged by the hook 10 of the link 11. This link 11 has pivotal connection to the upper end of the lever 12 at the bearing 13. This lever 12 has extension 14 mounting the lever fast upon the rock shaft 15 which extends along the housing 4 and is rockably carried in the bearings 16, 17, extending from the housing 4.

The lever 12 is provided on its opposite sides with the bearing cheeks or plates 18, 19, over which may slide the block 20 as fitted thereto by the channel bearing 21 with which the screws 22 through the block 20 may coact for taking up any lost motion. The bearing plate 19 is graduated to permit ready determination of range of adjustment of the block 20 along the lever 12 as effected by the hand wheel 23 fast with the longitudinally fixed screw 24 extending through the eye 25 at the top of the lever 12 and engaging the threaded eye 30 in the block 20.

When the hand wheel 23 is adjusted the screw 24 may be locked by running the nut 31 thereon into snug position against the eye 30. The block 20 has the pair of lug extensions 32 between which is pivoted the link 33 extending to the rock arm 34 loosely mounted on the shaft 35. Fast on this shaft 35 is the ratchet wheel 36 engaged by the pawls 37 pivotally carried by the rock arm 34.

The extension lugs 32 from the block 20 also have pivotally connected thereto the link 38, similar to the link 33, for oscillating the arm 39 loose upon the shaft 35 adjacent the arm 34. This arm 39 has gravity actuated ratchets 40 coacting with the ratchet wheel 36 alternately with the gravity pawls 37. Accordingly, in the oscillation of the shaft 12, the throws of which may be varied according to the wrist pin connection to the disk 6, there is this intermittent grip device for thus effecting a continuous rotation of the shaft 35 in one direction independently of the driving direction of the shaft 2. This intermittent grip device may be readily rendered inoperative as to driving the shaft 35 by working the block 20 into the fulcrum region of the lever 12, or by lifting the hook link 11 to disconnect from the shaft 2.

This disconnecting of shaft 35 from driving may have utility in clearing the feeder by the ribbon scroll which also serves to effect continuous discharge even at very slow feed rate. The sprocket wheel 41, fast on the shaft 2 may, through its sprocket chain 42 and sprocket wheel 43 fast on the sleeve 44, drive the ribbon 45 for effecting discharge from the housing 4 through the chute 46.

Fast on the shaft 35 and in the region under the supply way 3 is the scroll conveyer 47, the speed of which can be varied from zero to the maximum of throw for the lever 12. In materials liable to pack, clog or sudden slides, the agitators 5 in the hopper may be supplemented by the additional agitator shaft 48 therebelow having on one end thereof the crank 49, in this instance shown as toward the delivery end, provided with the wrist pin 50 over which the hook 51 of the link 52 may detachably engage. This link 52 is pivotally connected at its forked hooked end with the arm 53 on the rock shaft 15. Accordingly, in the oscillation of the lever 12, and with it the rock shaft 15, the link 52 may oscillate the shaft 48 carrying the agitators 54 in the lower part of the hopper 3. This long bearing for the shaft 15 insures such rigidity in the assembly of this intermittent grip device to the housing of the feeder that there may be a refinement in adjustment for the drive which is assured, even under considerable load conditions, and whether the feed rate is varied by the adjustment of wrist pin 8 into different openings 7 or by shifting of the block 20.

What is claimed and it is desired to secure by United States Letters Patent is:

1. Feeding means comprising a driving shaft, a rock shaft, a conveyer shaft, a housing providing a plurality of bearings for said shafts and a material travel way, intermittent driving means between the driving shaft and the conveyer shaft including a rock lever fixed to the rock shaft, and a conveyer on the conveyer shaft in the housing, said bearings for said rock shaft constituting means for maintaining said rock shaft in parallelism with said conveyer shaft.

2. Feeding means comprising a driving shaft, a rock shaft, a conveyer shaft, an agitator shaft, a housing providing bearings for said shafts and a material travel way, intermittent driving means between the driving shaft and the conveyer shaft including a rock lever fixed to the rock shaft adjacent the bearing for the shaft, a conveyer on the conveyer shaft in the housing, agitators on the agitator shaft and in the housing, and means spaced from the lever by the rock shaft bearing, connecting the rock shaft with the agitator shaft for actuating the latter.

In witness whereof I affix my signature.

FOREST G. GAUNTT.